United States Patent [19]

Leonard

[11] Patent Number: 4,591,136
[45] Date of Patent: May 27, 1986

[54] SPRING MECHANISMS

[76] Inventor: George H. Leonard, 327 Hollow Tree Ridge Rd., Darien, Conn. 06820

[21] Appl. No.: 599,783

[22] Filed: Apr. 13, 1984

[51] Int. Cl.$^4$ .............................................. F16F 1/14
[52] U.S. Cl. .................................... 267/154; 16/308; 49/386; 74/99 A; 180/69.21; 185/37; 267/57; 280/721
[58] Field of Search .................. 267/154, 57, 69, 134; 185/37, 38; 74/99 A; 16/308, 303, 298, 296, 289, 286, DIG. 36; 280/721, 723, 700, 695, 664; 180/69.21; 296/57 A, 76; 188/134; 49/386

[56] References Cited

U.S. PATENT DOCUMENTS

| 132,710 | 11/1872 | Buckman . | |
|---|---|---|---|
| 2,220,916 | 11/1940 | Schiff | 267/57 |
| 2,591,281 | 4/1952 | Musschoot | 267/154 |
| 2,778,626 | 1/1957 | Klepp | 267/154 |
| 3,022,536 | 2/1962 | Floehr . | |
| 3,271,812 | 9/1966 | Skolnik | 16/197 |
| 3,406,523 | 10/1968 | Baker et al. | 267/154 X |
| 3,421,262 | 1/1969 | Floehr . | |
| 3,718,326 | 2/1973 | Ristau | 267/154 X |
| 3,787,923 | 1/1974 | Patterson . | |
| 4,333,553 | 6/1982 | Hoppie et al. | 185/37 X |
| 4,423,536 | 1/1984 | Cross | 16/DIG. 36 |

FOREIGN PATENT DOCUMENTS

| 962382 | 6/1950 | France | 267/57 |
|---|---|---|---|
| 400752 | 4/1974 | U.S.S.R. | 267/154 |

Primary Examiner—Bruce H. Stoner, Jr.
Assistant Examiner—Michael P. Gilday

[57] ABSTRACT

The disclosed spring mechanism is useful, for example, as a counterbalance or as a spring suspension. The preferred form of mechanism has opposite output parts for connection to the external apparatus. One output part is fixed to two side-by-side torsion-spring columns—two bundles of rods—and the side-by-side opposite ends of the columns bear diametrically opposite cam followers. The second output part is unified with complementary cam tracks for the cam followers of both columns. The spring mechanism has varied characteristics, depending on the shapes of the cam tracks.

27 Claims, 18 Drawing Figures

SPRING MECHANISMS

The present invention relates to stored energy devices such as counterbalances and resilient suspensions.

BACKGROUND

A rudimentary familiar example of a counterbalance is represented by a simple coil spring (or a pair of coil springs at spaced-apart hinges) used for maintaining the hood of an automobile in its raised position. Such a spring counterbalance may be used to illustrate the fundamental properties of such devices. When a hood equipped with a spring counterbalance is to be lifted from its horizontal closed position, commonly much of its weight is not counterbalanced so that considerable effort is required. With the hood in its raised position, it is common for counterbalance springs to overcompensate for the weight of the hood.

Compression coil springs have basic characteristics of exerting increasing force as they become progressively more compressed, and of having a more-or-less constant rate, i.e., requiring a constant increase in force for each increment of compression. These characteristics are taken into account poorly in common spring counterbalances.

Compression coil-spring counterbalances ordinarily occupy a large volume where a large weight is involved. In some applications of counterbalances where space is severely limited, efficient utilization of space is important.

Compression coil springs are considered quite dependable, and yet they do fracture occasionally. Such catastrophic failure of a spring counterbalance can have serious consequences. A heavy lid can slam suddenly, causing grave personal injury.

The same attributes of coil springs are limitations in other spring devices, such as compression coil springs used as "suspensions" in automobiles.

The foregoing limitations are ideally taken into account in an illustrative form of counterbalance shown and described in my prior application Ser. No. 422,838, filed Sept. 24, 1982 and Ser. No. 477,337 filed Mar. 21, 1983, both now abandoned. In that illustrative embodiment, a bundle of resilient rods is subjected to torsion. End portions of the rods are keyed in sockets that are arrested against turning. One or more cam-follower arms are keyed to the outside of a load-bearing tube which in turn is keyed to the rods within the tube at a point or points along the bundle between the arrested end portions of the bundle. The arms bear against respective cams that are fixed to the load to be counterbalanced. Notably, the cams are parts that are to be mounted in the equipment to be controlled and the sockets keyed to the ends of the bundle of rods are locked in that equipment so as to resist the torsion that develops. The cams operate about pivots whose common axis is parallel to the bundle of rods. As the cams are forcibly turned, the cam-follower arms twist a portion of the bundle of rods between its ends about the axis of the bundle, developing torsion in the bundle of rods. The contour of the cams is related to the load so that the desired effort developed by the bundle of rods is applied to the load continuously along the cam surface. Energy is stored in the bundle rods, or delivered to the load, at rates determined by the cam contour.

SUMMARY OF THE INVENTION

The illustrative embodiment of the invention and its modifications detailed below and shown in the accompanying drawing represent novel spring mechanisms having a pair of output parts that move relative to each other along an axis in applying effort to a load. Ordinarily the output parts are opposite end portions of the mechanism. A pair of resilient side-by-side spaced-apart torsion columns provides for energy storage. The term "column" is used for convenience, signifying only an elongated unit. Side-by-side portions of the torsion columns are secured against turning about the respective column axes. Those portions are connected to one of the output parts in the illustrative embodiment. In a modification, one of the output parts is secured by clamps to side-by-side end portions of the columns while resistance to torsion in the bundles is provided separately by an adjustment device that is keyed to portions of the columns near their clamped end portions.

Second end portions of the torsion columns are subjected to mutually opposite twisting, i.e. clockwise twisting of one column about its axis and counterclockwise twisting of the other, by an assembly of cams and cam followers. For each column, two pairs of column-twisting cam tracks and cooperating cam followers are disposed at diametrically opposite sides of the column axis. The cam tracks are complementary so that operation of the cam assembly does not tend to bend the column. The united cam tracks of both columns are fixed to the second output part. (It is understood that in a reversal of the cam assembly, the cam followers may be fixed to the output part and then two of the complementary cam tracks would be fixed to an end portion of each of the columns.) Accordingly, the torsion columns are either twisted equally and oppositely or their twist decreases equally and oppositely as the second output part moves nearer to or further from the first output part.

The dual torsion column and cam mechanism can be designed so that the spring mechanism can provide desired effort acting on the load (such as a heavy lid) continuously as the output parts move closer together or farther apart. The cams may also provide detents for the load at one or more positions. The amount of spring effort provided by the mechanism may be varied along the stroke of the output part(s). For example, the mechanism can be designed to help the user raise a heavy lid, providing desired effort at each point along the path of the lid. Similarly, where the torsion-column-and-cam assembly is used as a spring suspension, the cam contours may be designed to center the load, and to store energy imparted by the load as it is deflected above and below its centered position, and to release stored energy to the load in returning the load to its centered position. In effect, the contours of the cams can provide changing spring rates and desired input/output forces at each point along the path of a suspended load above and below its nominally centered position.

Because the cam organization of each torsion column applies balanced torsion to the column, bending of the column is avoided as the output parts move toward and away from each other. Opposite directions of twist are developed in the columns by the cam assemblies of the two columns as the output parts move nearer to each other or farther apart. Accordingly, the stresses developing in the operation of the spring mechanism that uses two torsion columns are balanced internally, i.e., the twisting stresses at the ends of the columns are not imposed on the load. Only the desired end-to-end effort develops at the output parts. Torsion stresses are confined within the spring mechanism.

Each column in the illustrative embodiment is formed of a bundle of rods. The rods at each end of the bundle are clamped together securely. As a result, each column develops stiff resistance to bending. Each column in the illustrative embodiment addtionally provides reaction to lengthwise forces of tension or compression between the first and second output parts of the spring mechanism.

It would be possible for the clamps that grip the bundles of rods near their ends to be replaced by sockets keyed to the rods only for developing torsion without locking the columns against sliding. In that case, it is contemplated that the other functions performed by the bundles—resistance to bending and resistance to lengthwise forces between the column ends that are secured together and the column ends where the cams operate—would be performed by a separate, additional column. The resulting spring mechanism would function in many respects like the illustrative embodiment, but it would be much more complicated in practice.

If the application of the spring mechanism were such that torsion is readily resisted by the load apparatus, and particularly in case it were desirable for twisting effort to be provided between the output parts, one torsion column rather than two would be useful. Other than the internal balance of torsion stresses that results from the two-column configuration, the other attributes of the illustrative spring mechanism would be retained in a spring mechanism having only one torsion column.

As already noted, the exemplary illustrative spring mechanism to be described in detail includes two torsion columns and has two pairs of cooperating cam parts for each column. The cam followers in this exemplary spring mechanism are diametrically opposite each other and the cam tracks are complementary to each other. The cam followers opposite each other as do the cam tracks during operation of the mechanism.

Due to the pairs of cam parts provided for each column, the stresses imposed on each column during operation of the cam parts are only a twisting stress and an axial or lengthwise stress—which may be tension or compression. In an equivalent arrangement, three pairs of cam parts could be used, distributed at 120° angles around the axis of the torsion column. Any number of equally spaced cams and followers are just as effective as the two diametrically opposite pairs of cam parts in developing balanced effects of the cams on the columns. The following specification is drawn to the two diametrically opposite pairs of cam parts per column that perform well in the exemplary apparatus, to avoid generalized terminology that might be confusing. Additionally, the two-column mechanism is most practical.

Instead of using two (or more) pairs of cooperating cam parts, it would be possible to use only one cam track cooperating with one cam follower for each column, if the column were stiff enough to preclude harmful cam-induced bending or deflection. However, a column that is notably stiff in resistance to bending or deflecting stresses is a column that normally has high resistance to torsion. Consequently, it would tend to twist through an unduly small angle in building up (or releasing) the requisite stored energy. At the cost of complicating the mechanism, supplementary structure could be introduced to provide needed stiffness of the torsion column or columns for resisting the bending stresses that would develop if only one cam track and cam follower were used for each of the torsion columns. Even then, the bearing stress of the cam follower against the cam track could become excessive. This discussion helps to demonstrate the value in the exemplary spring mechanism of providing multiple deflection-avoiding cam followers and cam tracks for each torsion column.

The described spring mechanism, especially in a form that uses a bundle of resilient rods for each torsion column, combines the following attributes.

The mechanism is extremely reliable. The possiblity of of failure is remote. Moreover, catastrophic failure is virtually impossible.

The mechanism lends itself to remarkably compact proportions, for any given load rating. The volume efficiency is quite high for any given load requirement.

The mechanism is self-contained, in the sense that the cam structure forming part of the spring mechanism needs no external mounting provision. The cam mechanism is incorporated between opposite output parts. Stated otherwise, only two simple connections are required between the exemplary spring mechanism and the apparatus in which it is installed.

The spring mechanism is equally adaptable to provide pushing or pulling effort and, in the exemplary form, the spring mechanism provides both pulling and pushing force or reaction along different parts of its stroke.

The mechanism can be designed to provide varying spring rates along the operating stroke. As such, the mechanism can provide detent action or assistance or retarding effort, or the external load can be balanced; and these effects can all be used at different parts of the operating stroke.

Due to the role of the cam mechanism that is incorporated, bearing friction can be made useful in contributing to the desired operating characteristics.

The construction of the mechanism is readily modified to adapt it to widely different values of load; and any given mechanism is adjustable for adapting it to a range of load values.

The foregoing and other attributes mentioned below render the illustrative embodiment particularly attractive. Modifications are contemplated that take advantage of some or all of the novel aspects of the illustrative embodiment, and still other modifications will become evident. The nature of the invention in its various aspects will be more fully appreciated from the following detailed description of the presently preferred embodiment and certain modifications shown in the accompanying drawings.

The illustrative spring mechanism of FIGS. 1–6 is an exemplary embodiment of the various aspects of the invention. It includes first and second output parts, shown in the drawing as the lower and upper output parts 10 and 12 of the mechanism. These two output parts (for example) are to be secured to the base and the lid, respectively, of equipment (not shown). In FIGS. 1–5, the lid is assumed to be closed, pressed down and latched closed. When the lid latch is released, the lid can easily be raised by the user. The spring mechanism serves as a counterbalance for much of the weight of the lid, or all of its weight, or the counterbalancing spring may overcompensate for the weight of the lid, as may be desired. While various stresses develop within the spring mechanism, the only stresses developed by and applied to the spring mechanism are end-to-end forces at output parts 10 and 12. As will be seen, torsion stresses developed within the mechanism are self-canceling within this mechanism.

Torsion columns or elongated resilient units 26, 28 extend from first portions (lower portions in the drawings) where they are secured to lower output part 10. Second portions of the torsion columns (upper portions in the drawings) are secured to respective cam followers. An assembly of cam tracks that cooperate with these cam followers is unified with second (upper) output part 12.

Columns 26 and 28 are bundles of hexagonal rods in the illustrative spring mechanism. The bundles of rods are unified by clamps at their upper and lower end portions, as described below. As will be seen, the clamps perform three separate functions in the mechanism of FIGS. 1–6. First, the clamps (which are fixed to portions of the mechanism that impose torsion on the columns) cause each gripped portion of a rod to twist or turn about its axis. Second, the clamps unify the gripped end portions of a bundle of rods, developing great stiffness of the column against bending without correspondingly developing torsion-resisting stiffness of the bundle of rods. Third, the clamps fix the distance between the lower output part 10 and cam parts that are fixed to the upper ends of the bundles of rods, and thus the clamps fix the lengths of the columns, thereby determining a controlling factor in the torsion resistance of the columns.

Figure 4:
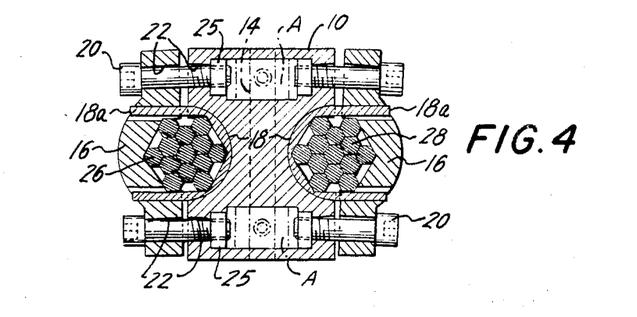
Figure 5:
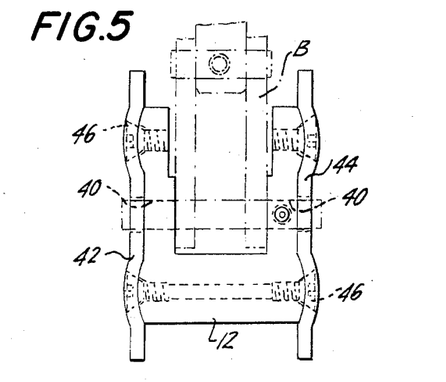
FIG. 5 is a top plan view of the spring mechanism in FIGS. 1 and 2.
Figure 11:
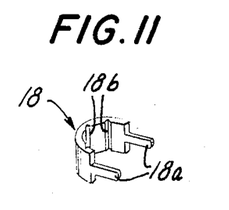

Output part 10 may be connected to a bracket A of apparatus in which the spring mechanism is used by a pin 14 in part 10. To the right and left of this pin in FIG. 4 are jaws of a duplicate pair of clamps. Considering the clamp at the left, it includes a jaw 16 having a recess formed to receive part of a hexagonal bundle of rods. Opposite jaw 16 is a part or cradle 18 having an internal recess that is also formed to receive part of the hexagonal bundle of rods. Part 18 is formed with an external bearing surface, part of a cylinder centered at the axis of the bundle of rods to be gripped. That external bearing surface is received in a complementary cavity in output part 10. Cradle 18 and output part 10 constitute a second jaw, acting with jaw 16 to clamp a bundle of rods 26. Cradle 18 (FIG. 11) has integral legs 18a received in jaw 16, to be adjustable in unison along torsion column 26. Recesses 18b are formed in cradle 18 complementary to rods of column 26.

Figure 10:
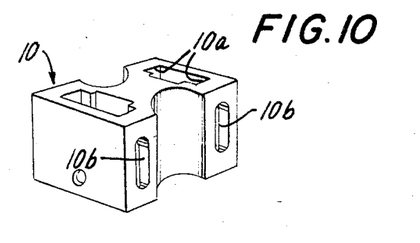

Jaws 16 and 10/18 are tightened against a bundle of rods by bolts 20. Each bolt extends through an over-size passage 22 that provides clearance for allowing the jaw to swing through a small adjustment angle. Bolts 20 are tightened into nuts 25 that are locked against turning in grooves 10a (FIG. 10). Slots 10b accommodate shift of bolts 20 through a range of adjustment along the torsion column, before the bolts are tightened. Normally there is clearance between output part 10 and each end of jaw 16. When jaw bolts 20 are tightened, the bundle of rods is clamped tightly. The angular position of the clamped end portion of the bundle of rods is adjustable by loosening one of the jaw bolts and tightening the other bolt. Clearance passages 22 for the bolts accommodate that adjustment.

Figure 1:
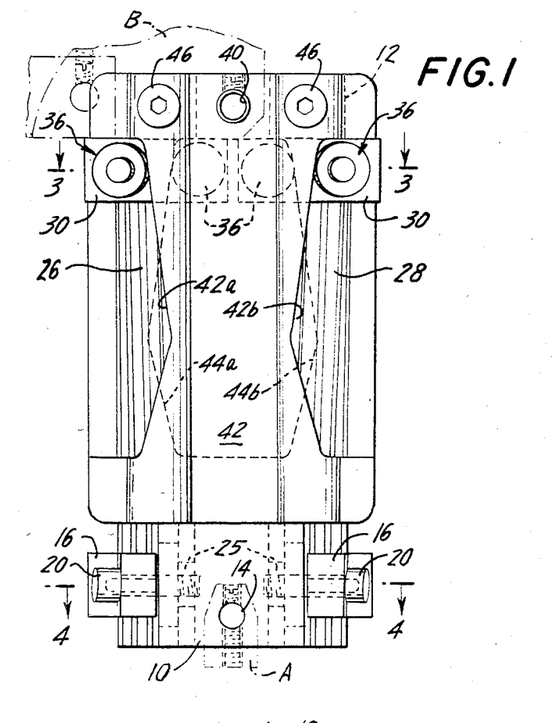
FIG. 1 is a front elevation of a spring mechanism with the upper output part pressed down to the limit, being a presently preferred embodiment of the invention in its various aspects.
Figure 2:
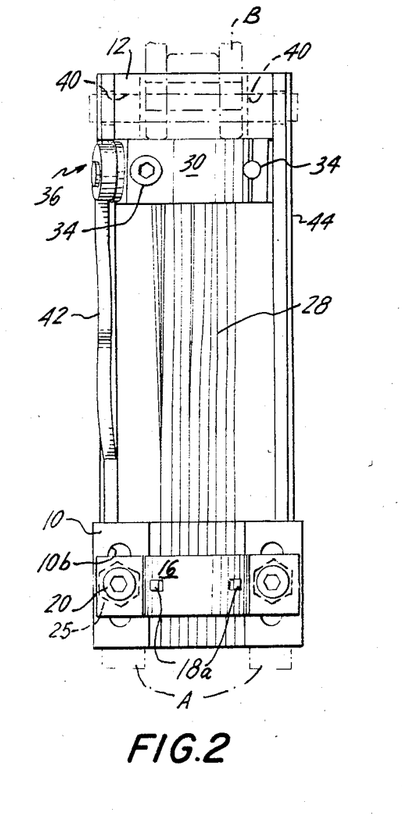
FIG. 2 is a right-hand elevation of the spring mechanism of FIG. 1.

Two bundles of rods that constitute torsion columns 26 and 28 have exposed lengths in FIG. 1 at the bottom of the mechanism, each bundle being gripped by a clamp 16, 10/18. Each exposed length is much greater than the width of jaw 16 and part 18. Accordingly, when bolts 20 are loose, each clamp 16, 18 can be raised and lowered through a range of adjustment. This arrangement provides for adjustment of the active lengths of the resilient columns, the bundles of rods 26 and 28.

Figure 3:
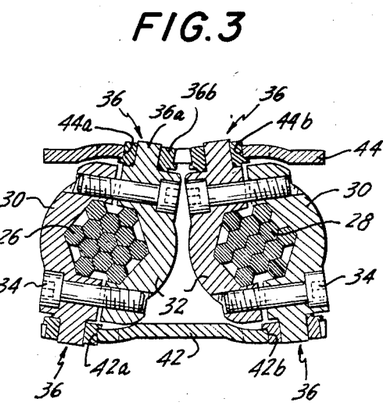
FIGS. 3 and 4 are cross-sections of the spring mechanism in FIGS. 1 and 2 at the planes 3—3 and 4—4 in FIG. 1.

As best seen in FIG. 3, the upper end portion of each of the bundles of rods 26, 28 is gripped and thus unified by a separate pair of jaws 30, 32. In the form shown, jaws 30 and 32 are duplicates of each other. Each jaw includes two half hexagonal recesses for the roughly hexagonal bundles. When the jaws are clamped on the two bundles, there is clearance between them for assurance that the rods of each bundle are tightly gripped and unified. A bolt 34 at each side of each bundle tightens its jaw against one of the bundles. Bolts 34 at the top of FIG. 3 become spaced apart for access when the mechanism is in the extended condition of FIG. 6.

An assembly of cam parts couples the upper ends of the torsion columns to output part 12. Each jaw 30 and 32 has an integral pin 36a bearing a roller 36b, constituting cam follower 36. The cam followers of each column are diametrically opposite each other in relation to the central axis of the related torsion column. In concept, more than two cam followers could be used, equally spaced apart about the axis of each column, to avoid deflecting the upper end of the torsion column away from the initial axis of the column.

Upper output part 12 has a bore 40 to receive a pin which connects that output part to part B of the equipment to be counterbalanced. Two cam plates 42 and 44 are fastened to output part 12 by screws 46. These plates provide a total of four cam tracks 42a and 42b, and 44a and 44b. The contours of cam tracks 42a and 42b are mirror images of each other, also true of cam tracks 44a and 44b. Cam tracks 42a and 44a are complementary. In cooperating with cam followers 36 of torsion column 26, cam tracks 42a and 44a apply torsion to that column 26 in a balanced manner. Since paired cam tracks are complementary, they avoid applying a transverse force that would tend to shift the gripped upper end of the column transverse to its axis in any direction. These cam tracks are formed in cylindrical-segment portions of plates 42 and 44, curved about the axes of the columns.

Figure 8:
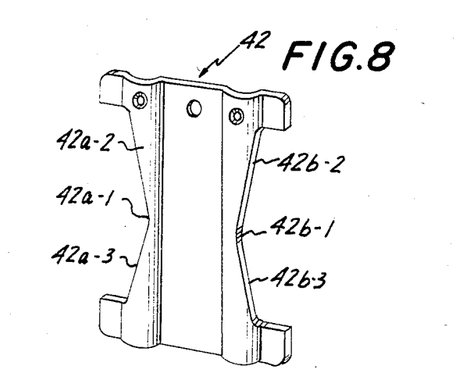
Figure 9:
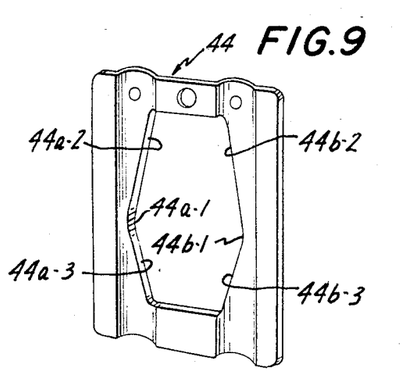

Cam-track portion 42a-1 (FIG. 8) is near the midpoint of the cam track. When a cam follower 36 cooperates with the portion 42a-1, portion 44a-1 of cam track 44a (FIG. 9) cooperates with the diametrically opposite cam follower 36. In this condition (see FIG. 6) minimum torsional stress is applied to torsion column 26 by the cam mechanism.

Figure 6:
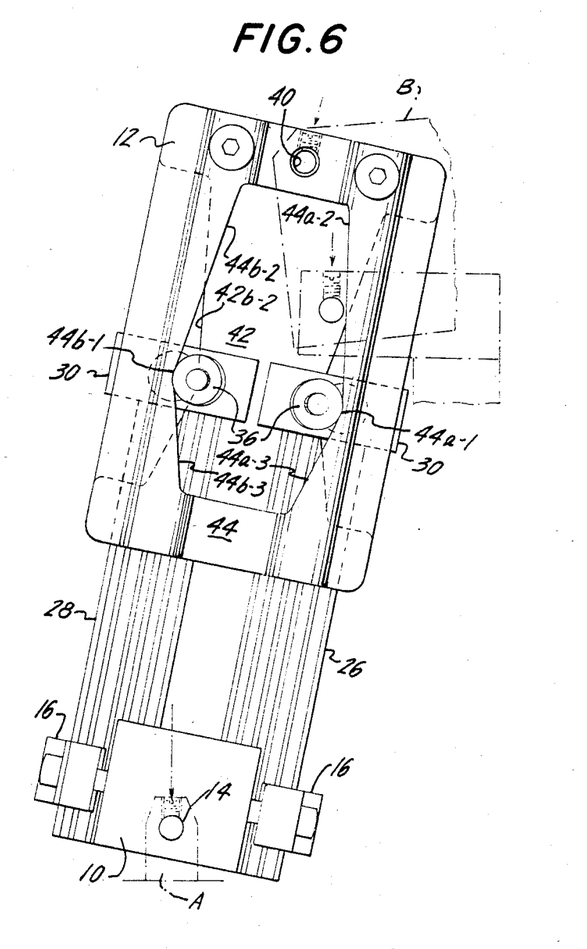
FIG. 6 is a rear view of the mechanism of FIG. 1, the view of FIG. 6 representing the spring mechanism in its minimum-stress condition.
Figure 7:
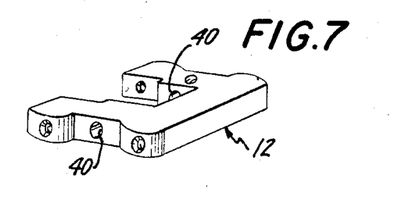
FIGS. 7–11 are reduced-scale perspective views of components of the spring mechanism of FIGS. 1–6.

Cam track portions 42a-2 and 44a-2 are long gradually sloping segments which are complementary to each other and which develop progressively greater stored energy in torsion column 26 as output part 12 is pressed from its position in FIG. 6 to that position shown in FIG. 1. During that stroke, cam track 42a and its cooperating cam follower act as one pair of cam parts and cam track 44a and its cam follower act as a second pair of cam parts, for applying torsion to column 26. Cam track 42b with its cam follower and cam track 44b with its cam follower are two pairs of cam parts that twist column 28. If it is assumed that a heavy equipment lid is the load attached to output part 12, closing pressure on the lid drives the spring mechanism from its configuration in FIG. 6 to that in FIG. 1. Effort is applied to the equipment lid in going from its raised position to its closed position. Cam track segments 42a-2 and 44a-2 have quite a gradual slope. In that case, when the lid is to be raised, the lid-opening force tends to be quite small. The small amount of lid-opening force derived from release of the twisted torsion columns, modified by the contour of the cam tracks, is reduced by friction of cam-follower rollers 36b on their pins 36a. The end result may be designed so that the weight of the equipment lid is exactly counterbalanced. Then the lid can be raised with minimal effort.

In the assumed application of the spring mechanism of FIGS. 1–6 to counterbalance a heavy lid, the user might apply more force than needed to open the lid. A heavy lid would tend to over-shoot the minimum-torsion point in the operating stroke, when cam-track portions 42a-1 and 44a-1 come into effect. The heavy and perhaps fast moving lid could do damage when the lid over-shoots. Here, complementary cam tracks include relatively steep track segments 42a-3, 44a-3 and 42b-3, 44b-3 cause energy to be stored as the lid over-shoots its desired end position, due to the opening momentum of the lid. Here, opening of the lid is slowed without a thump such as would occur if the lid reached an upper-limit stop. The over-travel motion is then reversed by energy output from the spring mechanism as the lid is returned to the minimum-stress condition of the mechanism.

The portions of the cam tracks 42a-3 and 44a-3 are very much like those which are needed for a suspension-spring mechanism pursuant to the invention. In such a mechanism, a steep-slope segment of each cam track would be provided in place of more gradual sloping cam-track portions 42a-2 and 44a-2. The cam tracks can be varied in contour for achieving variations in the effective spring rate with increased deviation of the cam followers from their nominally centered position 42a-1, 44a-1 and 42a-1, 44b-1.

As noted above, torsion column 28 is stressed—and its stored energy is released—in the same manner as described for column 26, the diametrically opposite cam followers 36 and the complementary cam tracks. Torsion column 28 twists, and its twist is released, in the turning direction opposite to that of column 26. The reverse torsions are resisted at the bottom of the mechanism where portions of columns 26 and 28 are both prevented from twisting by both being keyed—actually locked—to output part 10. The reverse torsions are mutually canceling at the top by having all of the cam tracks 42a, 42b, 44a and 44b united to each other.

Figures 12, 13, 14, 15, 16, 17, 18:
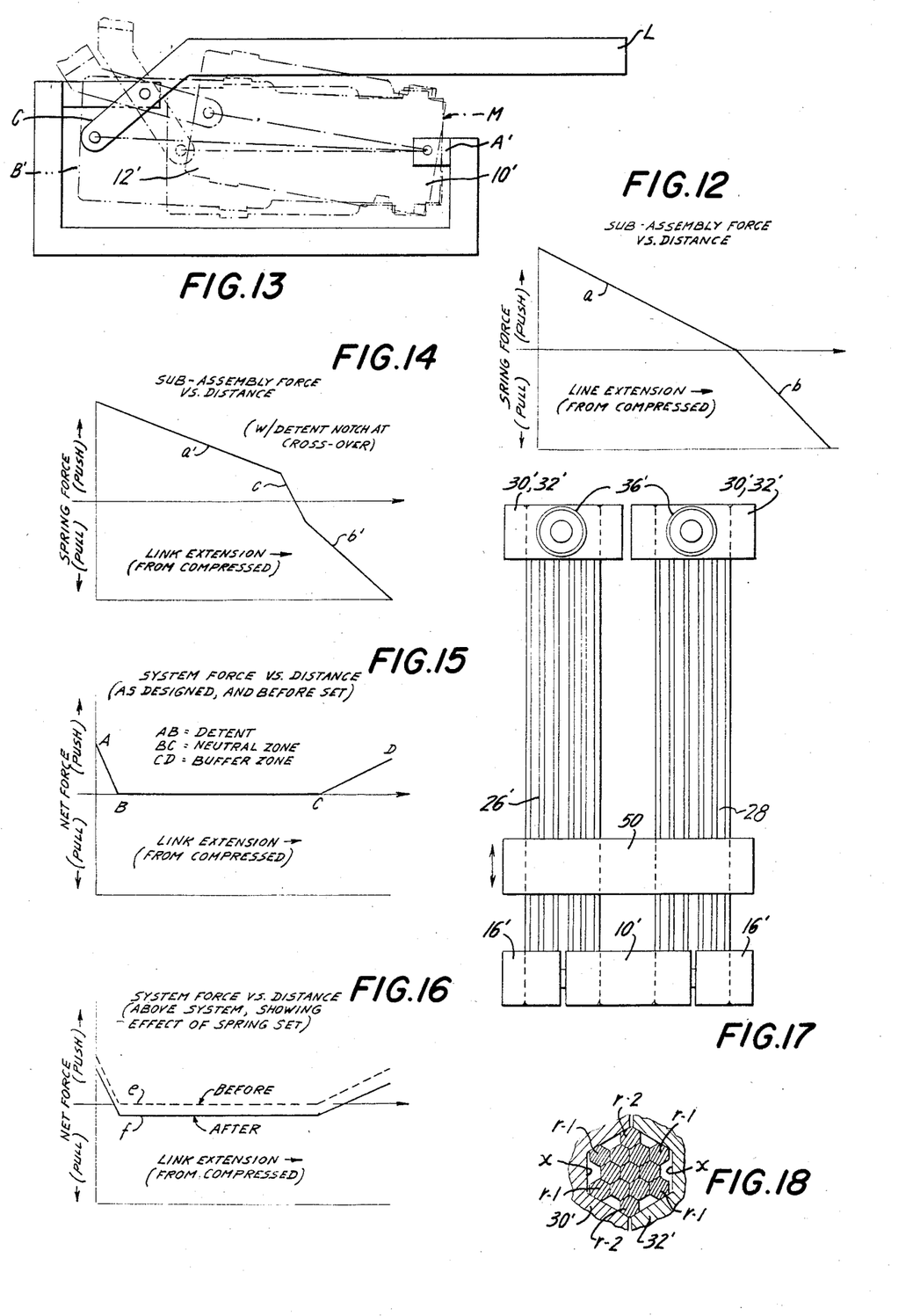
FIG. 12 is a force-displacement diagram of the mechanism of FIGS. 1–6.
FIG. 13 is a diagram representing a typical application of a novel spring mechanism, being a modification of that shown in FIGS. 1–6.
FIG. 14 is a force-displacement diagram of a modified spring mechanism.
FIGS. 15 and 16 are force-displacement diagrams of apparatus such as that of FIG. 13, with a further modification of the novel spring mechanism.
FIG. 17 is a front elevation of part of a novel spring mechanism, being a modification of FIGS. 1–6.
FIG. 18 is a fragmentary detail of a modification of the spring mechanism of FIGS. 1–6.

The slopes of the cam tracks and their effect on the cam followers in applying torsion to the bundles of rods 26 and 28 is represented in FIG. 12. The gradual-sloping line a represents the effect of complementary cam track segments 42a-2/42b-2 and 44a-2/44b-2 cooperating with pairs of cam followers 36. Part a of the operating characteristic comes into effect as the counterbalanced equipment part is forced ("pushed") from the minimum-stress point in FIG. 6 toward that in FIG. 1, occurring (for example) when an equipment lid is pushed down; and the same portion a of the stress diagram becomes reversely effective when (in this example) the equipment lid is being raised.

Part b of the operating characteristic, steeper than part a, represents the torsion developing when complementary cam portions 42a-3/42b-3 and 44a-3/44b-3 cooperate with pairs of cam followers 36. This occurs when the upper assembly is forced ("pulled") from the minimum-stress condition of FIG. 6 to increase further the separation of output parts 10 and 12. Part b of the characteristic comes into effect as the counterbalanced equipment part is forced ("pulled") beyond the stable minimum-stress point, occurring (in the example of an apparatus lid equipped with this mechanism) when the lid is flung open with unnecessary force and over-travels past the position of FIG. 6. The spring mechanism takes up and stores the kinetic energy of the opening lid and, after the lid stops, the spring mechanism returns the lid to the rest position (FIG. 6) at which the minimum-stress condition prevails.

The cam tracks can be contoured as desired, taking into account the load's weight or mass and the nature of the linkage in the apparatus that is equipped with the spring mechanism. In the configuration of FIG. 13, a spring mechanism M similar to that of FIGS. 1–6 has one output part 10' pivoted to a stationary bracket A' and another output part B' is pivoted to crank C of an apparatus lid L. In FIG. 13, lid L is represented "closed". It may be desired that a firm detent shall be effective in the minimum-stress condition of the spring mechanism with the lid raised. In that case, more extreme recesses would be formed in the cam tracks than the slope reversals from 42a-2 to 44a-3 (FIG. 8) and from 44a-2 to 44a-3 of FIG. 9. The operating characteristic would then include a steep added segment c (FIG. 14) between segments a' and b' that correspond to segments a and b of FIG. 12. Portions 42a-1, 42b-1, 44a-1 and 44b-1 would then be shaped as dips that receive cam followers 36 and serve as detents.

The spring-stress diagrams of FIGS. 12 and 14 do not take into account many factors involved in the operation of the total apparatus. Thus, as lid L shifts from its horizontal closed position of FIG. 13 toward the vertical, a decreasing component of the force (represented by its weight) acts on the spring mechanism. Moreover, the changing angle between crank C and the ends of mechanism M represents variable leverage transmitting the force of the load to mechanism M. Similarly, the nature of the coupling affects the force transmitted from the spring mechanism to the load. The contours of the cam tracks can be varied considerably to realize the desired action at each point along the normal and overtravel strokes of operation.

It may be desirable that a lid should spring open a bit when it is unlatched, and to seem weightless to the person operating the lid during a normal opening stroke, and finally it may be desirable for the lid to be cushioned as it moves into (and a bit beyond) full-open position. That kind of action is readily achieved by designing appropriate cam-track contours to provide system forces represented by segments A-B, B-C and C-D in FIG. 15.

In practice, further factors modify the end result. Some degree of "set" in the rods may occur during initial operation, modifying the torsion of the spring mechanism. The change is represented by the initial (dotted) curve e in FIG. 16, to be compared with the full-line characteristic f. The design flexibility that can be attained with this mechanism makes it relatively easy for "set" of the torsion columns to be taken into account in realizing the desired operating characteristics.

In the spring mechanism shown, there is a significant build-up of stress at the cam followers. The resulting friction increases as the developed torsion increases. This friction is a controllable factor since pins 36a may have low-friction sleeve bearings, or there may be no anti-friction provision, or needle-bearings may be used. Due to the configuration of the mechanism, the bearing friction can be made useful in contributing to the operating characteristics desired, and in providing a non-critical counterbalance design. Where the spring force only approximates the effect of a load along an operating stroke, the contribution of this friction can result in the load remaining in place when released at positions along the operating stroke.

The form of torsion column represented by a bundle of rods is often of crucial importance in producing a spring mechanism that will fit in a given space and be of manufacturable proportions. For example, it might be necessary to provide a spring mechanism for a heavy lid, with a limited length of torsion columns. If a solid short torsion bar were used, the required spring energy storage might be produced by a design having only a very small twist angle over the whole operating stroke. The stresses would tend to be severe and the whole length of the cam tracks would be nearly straight. However, by using a bundle of rods as a torsion column, the same space limitation can be met while a much larger twist angle can be utilized. In the described mechanism, as the column is twisted, each rod twists about its own axis in resiliently storing or delivering energy. The entire bundle serves in a compact space to provide both a practically large twist angle and to develop the requisite torsion.

The percentage of the resilient metal of a rod that participates in energy storage in torsion is much greater than the percentage of wires of round cross-section that are involved in bending stresses, as in coil springs. In a rod that is twisted about its axis, areas of the cross-section all the way around the axis become stressed, whereas in round-wire springs, only diametrically opposite areas participate in stress-resistance. (In comparing the resilient performance of spring wire stressed in bending versus spring rods stressed in torsion, the same criteria are to be considered such as life, degree of stress toward the elastic limit, etc.) This discussion helps to demonstrate how the described spring mechanism is very efficient in utilizing the resilient material of the torsion columns, resulting in a volume-efficient spring mechanism.

In the final analysis, the described torsion-column spring mechanism is very space-efficient, providing a compact structure for given performance specifications.

The mechanism of FIGS. 1–5 utilizes the bundles of rods not only as torsion springs, but in their structural role of supporting and locating the assembly of cam followers at one end of each column, the other end of each column being fixed to output part 10. Great column stiffness of the bundle of rods is realized (without corresponding torsional stiffness) by virtue of the unifying effect of the clamps. As seen in FIG. 3 (for example) each rod is hexagonal; and each clamp 30, 32 bears against slant surfaces of three of the thirteen rods in the bundle shown. Those three rods are wedged against others of the rods when the clamps are tightened, unifying the gripped rods and creating a stiff torsion column.

The number of rods can be altered freely. For example, only the inner cluster of the seven rods shown could be used, or a cluster of three rods, etc. Moreover, some rods can extend the full length of the column while others could be omitted, retaining only a short length of each "omitted" rod in each clamp to serve as a filler. Further, the use of hexagonal rods is but a preferred example. Many other polygonal shapes are useful. If sufficiently secure clamping could be realized, even cylindrical rods could be used. However, rods of polygonal cross-section are more readily gripped for twisting and they may be clamped effectively so that the ends of the bundles are unified for column stiffness.

A modified clamp configuration for the same bundle of hexagonal rods as in FIGS. 3 and 4 is shown in FIG. 18. There, clamp 30', 32' (like clamp 30, 32) has a shifted relationship to the rods. Rods r-1 are spaced away from the bottoms x of the clamps. The jaws of the clamp have a wedging effect on rods r-1 and r-2, and those rods in turn unify the bundle. It is evident that secure rod-unifying clamps can take various forms.

The angular adjustment of the lower ends of the torsion columns afforded by cradle 18 and the angularly shiftable clamp (FIG. 4) is a valuable practical feature. All the cam followers can be pressed securely against their cams (eliminating possible looseness or "play") and the axes of bores 14 and 40 can be made parallel. This angular adjustment is accomplished by variously tightening and loosening bolts 20, as described above.

The operating stroke of the spring mechanism is represented by the travel of the cam-track assembly 12-42-44 in relation to the rest of the spring mechanism. That mechanism can have desired operating characteristics over the operating stroke, suitable for a load of some particular weight when clamps 16, 10/18 are fixed at a particular point along the torsion columns. The same spring mechanism can be made ideal for a given load and it can be used just as effectively with loads of different weights, by adjusting the utilized length of the torsion columns. Clamps 16, 10/18 at the lower ends of the torsion columns 26, 28 are adjustable along the columns for this purpose.

The function of imposing torsion on the columns does not require bundle-unifying clamps. The modification of FIG. 17 illustrates this point. Bundles of rods 26' and 28' are unified at their extremities by clamps 16'/10' and 30'/32'. (In a modified, more complex structure, the bundle of rods could be contained in a tube that would serve for providing column stiffness. A fitting 50 in FIG. 18 is adjustable along the torsion column, and may be secured in any adjusted position by a set screw (not shown) or by any other suitable means. Fitting 50 has two cavities that contain bundles 26' and 28'. Those cavities have a keyed fit around the respective bundles that prevents each bundle from twisting relative to the fitting. A close-fitting hexagonal cavity may serve to key and provide torsion coupling to the bundle of FIGS. 1–5. The simple hexagonal cavity may be modified by adding rigid projections to the cavity that would fill the vacant peripheral spaces between alternate rods of a bundle (FIG. 4). Fitting 50 is securely keyed to each bundle of rods, providing a torsion-coupling socket, but fitting 50 is not relied on to grip and unify each bundle.

When cam followers 36' are driven by a cam assembly (not shown) to twist torsion columns 26' and 28' oppositely, fitting 50 prevents portions of the columns from turning. The lengths of the columns below fitting 50 do not contribute to the energy-storage function of those torsion columns. Hence fitting 50 acts as two sockets providing keyed torsion coupling to the columns.

The lower ends of the torsion columns in FIGS. 1–6 are arrested against twisting relative to each other. Torsion columns 26 and 28 bear balanced pairs of cam followers 36. Cam plates 42 and 44 are so stiff that screws 46 at the top can be relied on to maintain the lower ends of those plates in proper spaced-apart positions. Moreover, the cam followers do not apply a spreading force to those plates.

The assembly of cam followers and cam tracks of FIGS. 1–6 could be reversed, in an inferior modification, such that a pair of complementary cam tracks can be fixed to the upper end of each torsion columns 26 and 28, and then all four cam followers 36 would be carried as a unit by output part 12.

The described spring mechanism, particularly where the torsion columns are bundles of rods, represents a particularly reliable device, having predictable long life. Even if an individual rod should fracture—most unlikely—there is no catastrophic failure of the mechanism, but only a slight change in its behavior. In a conventional spring mechanism that depends on a single spring, fracture of that spring represents catastrophic failure. In a single-spring counterbalance for a heavy lid, the lid could slam and cause injuries. The described spring mechanism is immune to that difficulty.

The foregoing represents a detailed description of an exemplary embodiment of the invention in its various aspects and a few modifications. It is readily apparent that other modifications may be made by those skilled in the art. Therefore, the invention should be broadly construed in accordance with its true spirit and scope.

What is claimed is:

1. A spring mechanism including:
   first and second output parts movable toward and away from each other,
   a cluster of parallel resilient metal rods, said cluster of rods having a twist axis parallel to said rods,
   first means secured to said first output part and fixed to a first portion of the rod cluster for preventing relative movement of the first output part along the rod cluster and for preventing turning of the first output part relative to said first portion of the rod cluster about said twist axis,
   plural cam couples distributed regularly about said twist axis, each of said cam couples comprising first and second parts, the parts of said cam couples being cam tracks that extend generally along and only partway around said twist axis and cam followers that cooperate with said cam tracks, respectively,
   second means for securing together said second output part and the first cam parts of each of said cam couples so that they are movable in unison relatively along said twist axis and are prevented from turning around said twist axis relative to each other, and
   third means for securing said second cam parts to each other and to a second portion of the rod cluster so as to be fixed thereto against relative movement along the rod cluster and against turning relative to said second portion of the rod cluster about said twist axis, said second portion of the rod cluster being spaced from said first portion thereof along the length of said rods,
   said mechanism including means for preventing turning of said first and second output parts in relation to each other about said twist axis,
   whereby relative movement of said first and second output parts along the rod cluster causes variably controlled torsion in the rod cluster as a function of the contours of said cam tracks.

2. A spring mechanism as in claim 1, wherein said cam couples consist of two cam couples opposite each other diametrically relative to said twist axis.

3. A spring mechanism as in claim 1, wherein said first cam parts that are secured to said second output part are said cam tracks and said second cam parts that are secured to said second portion of the rod cluster are said cam followers.

4. A spring mechanism as in claim 1, wherein said first securing means unifies said rods at said first portion of the rod cluster and wherein said third means unifies said rods as said second portion of the rod cluster, for stiffening the rod cluster against bending.

5. A spring mechanism as in claim 1, wherein said rods are duplicate regular polygons in cross-section.

6. A spring mechanism as in claim 4, wherein said rods are duplicate regular polygons in cross-section.

7. A spring mechanism as in claim 1, 5 or 6, wherein at least one of said first means and said third means comprises a clamp having first and second clamp parts, said first clamp part having a seat whose shape provides an interlocking fit to the rod cluster, said rod cluster being adjustably movable about its axis relative to said second clamp part, and means for tightening said clamp parts to a said portion of the rod cluster adjustably in relation to each other about said twist axis.

8. A spring mechanism as in claim 1, including fourth means adjustably positioned between said first means and said third means for preventing twisting of the rod cluster about said axis relative to one of said portions of the rod cluster, for thereby adjustably determining that portion of the rod cluster's length that undergoes twisting during relative movement between said first and second output parts.

9. A spring mechanism including:
   first and second output parts movable toward and away from each other, a pair of duplicate side-by-side and parallel clusters of parallel resilient metal rods, said clusters of rods having respective twist axes parallel to each other and to said rods.

first means, fixed in position along each of the rod clusters, for preventing side-by-side portions of the rod clusters from turning about their axes, plural cam couples including a set of cam couples distributed regularly about each of said twist axes, each of said cam couples comprising mutually cooperating first and second parts, the parts of said cam couples being cam tracks that extend generally along and only partway around their respective twist axes and cam followers cooperating with said cam tracks, respectively, second means for securing together said second output part and the first cam parts of each of said sets of cam parts so that all of said first cam parts are movable in unison relatively toward and away from said first output part along respective twist axes without turning about said twist axes, third means for securing said second cam parts of each set to each other and to secure said second cam parts of each set to a second portion of a respective one of the rod clusters so as to be fixed thereto against relative movement along the respective rod cluster and against turning relative to such second portion of the respective rod cluster about the twist axis thereof, said second portions of the rod clusters being spaced equally from the respective first portions of the rod clusters along the lengths of the rods, said mechanism including means for preventing turning of said first and second output parts in relation to each other about either of said twist axes, the sets of cam tracks and cam followers being related to each other to produce equal and opposite twisting of each of said rod clusters in relation to the other of the rod clusters as the distance changes between said first and second output parts, whereby relative movement between said first and second output parts along the rod clusters causes variably controlled torsion in the rod clusters as a function of the contours of the cam tracks.

10. A spring mechanism as in claim 9, wherein each set of cam couples consists of a pair of cam couples diametrically opposite each other in relation to the twist axes of the pair of rod clusters, respectively.

11. A spring mechanism as in claim 10, wherein said cam tracks are formed of two cam-track members secured to said second output part, said cam-track members being disposed, respectively, at opposite sides of side-by-side portions of both of the rod clusters, each of said cam-track members bearing one cam track of each of said pair of sets of cam couples.

12. A spring mechanism as in claim 10, wherein said cam tracks are formed of two cam-track members secured to said second output part, said cam-track members being disposed, respectively, at opposite sides of side-by-side portions of both of the rod clusters, each of said cam-track members bearing one cam track of each of said sets of cam couples, and wherein the cam tracks of each cam-track member are mirror-images of each other.

13. A spring mechanism as in claim 9 or 11, wherein said first means unifies said rods at the first portions of each of the rod clusters and wherein said third means separately unifies said second portion of each of the rod clusters for stiffening each rod cluster against bending.

14. A spring mechanism as in claim 9 or 11, wherein said rods are duplicate regular polygons in cross-section.

15. A spring mechanism as in claim 1, 9 or 11, wherein each of said cam tracks includes an intermediate portion which develops minimum torsion in said pair of rod clusters when each such intermediate portion is in cooperation with its related cam follower and wherein each of said cam tracks includes portions extending in opposite directions from said intermediate portion which, when in cooperation with their related cam followers, develop increased torsion in the rod clusters.

16. A spring mechanism as in claim 9 wherein, for each rod cluster, at least one of said first means and said third means comprises a clamp having first and second clamp parts, said first clamp part having a seat whose shape provides an interlocking fit to the rod cluster, such rod cluster being adjustably movable about its axis relative to said second clamp part, and means for tightening said clamp parts to a said portion of the rod cluster adjustably in relation to each other about the twist axis of such rod cluster.

17. A spring mechanism as in claim 16, wherein said rods are all duplicate polygons in cross-section.

18. A spring mechanism including:

first and second output parts movable toward and away from each other, a pair of duplicate side-by-side parallel rod clusters, each said rod cluster comprising multiple parallel resilient metal rods, said rod clusters having axes parallel to each other and to said rods, first means for securing together said first part and side-by-side first portions of the rod clusters for preventing said first portions from turning about their twist axes, a set of cam couples for each of said rod clusters, the cam couples of each set being distributed regularly about the twist axis of its respective rod cluster, each of said cam couples comprising mutually cooperating first and second parts, the parts of said cam couples of each set being cam tracks that extend generally along and only partway around a said twist axis and cam followers cooperating with said cam tracks, respectively, second means for securing together said second output part and the first cam parts of said sets of cam parts so that all of said first cam parts are movable in unison relatively toward and away from said first output part along said parallel twist axes without turning about either of said twist axes, third means for securing said second cam parts of each of said sets of cam parts to respective side-by-side second portions of said rod clusters so that the second cam parts of each set are fixed against turning relative to such second portion of its respective rod cluster about the twist axis thereof, said second portions of the rod clusters being spaced equally from the respective first portions of the rod clusters, said mechanism including means for preventing turning of said first and second output parts in relation to each other about either of said twist axes and said mechanism including means for maintaining essentially constant the space between said second cam parts and said first means, the sets of cam tracks and cam followers being related to each other to produce equal and opposite twisting of each of the rod clusters in relation to the other of the rod clusters, so that relative movement between said first and second output parts along the rod clusters causes variably controlled torsion in the rod clusters as a function of the contours of the cam tracks.

19. A spring mechanism as in claim 18, wherein each set of cam couples consists of a pair of cam couples diametrically opposite each other in relation to the twist axes of the pair of rod clusters, respectively.

20. A spring mechanism as in claim 19, wherein said cam tracks are said first cam parts and accordingly are secured to each other and to said second output part, the cam tracks of each diametrically opposite pair of cam couples being mutually complementary and the cam tracks of the pair of sets of cam couples constituting mirror-image pairs of cam tracks.

21. A spring mechanism as in claim 20, wherein each of said cam tracks includes an intermediate portion which develops minimum torsion in said pair of rod clusters when each such intermediate portion is in cooperation with its related cam follower and wherein each of said cam tracks includes portions extending in opposite directions from said intermediate portion which, when in cooperation with their related cam followers, develop increased torsion in the rod clusters.

22. A spring mechanism as in claim 1, 9 or 18, including a device having significant weight and being movable up and down along an operating stroke, and a mechanical coupling between one of said output parts and said device, the other of said output parts being fixedly located, said cam tracks having contours such as to counterbalance at least approximately the weight of said device along a substantial portion of said operating stroke.

23. A spring mechanism, including a spring-and-cam combination having first and second output parts movable toward and away from each other, means holding one of said output parts at a fixed position, a device having substantial weight movable up and down through an operating stroke, and a mechanical coupling between said device and said spring-and-cam combination, said spring-and-cam combination having any number, including one, of torsion column units, each of said number of torsion column units including:

a torsion column having a twist axis and comprising at least one elongated resilient metal rod, first means for securing a first portion of said torsion column to said first output part and for fixing said first portion of each of said number of torsion columns against turning about its axis relative to said first output part, at least one cam couple comprising first and second cam parts, said cam parts including a cam track extending along and only partway around a respective torsion column and a cam follower cooperating with said cam track, second means for securing said first cam part to said second output part and for preventing said first cam part from moving about said twist axis, and third means for securing said second cam part against turning relative to a second portion of said torsion column spaced along its twist axis from said first portion of such torsion column, the cam tracks in all of said number of torsion column units having such contour as, acting through said mechanical coupling, to counterbalance at least approximately the weight of said device along a substantial portion of said operating stroke.

24. A spring mechanism as in claim 23 wherein there are two of said torsion column units in said spring-and-cam mechanism whose torsion columns are side-by-side duplicates of each other and parallel to each other and wherein said cam tracks of said torsion column units are shaped to twist their respective torsion columns equally and oppositely during the movement of said first and second output parts relatively toward and away from each other.

25. A spring mechanism as in claim 23, wherein each of said number of torsion column units includes a pair of said cam couples diametrically opposite to each other, the cam tracks of said diametrically opposite cam couples being mutually complementary.

26. A spring mechanism as in claim 23, wherein there are two of said torsion column units in said spring-and-cam combination whose torsion columns are side-by-side duplicates of each other and parallel to each other and wherein said cam tracks of said torsion column units are shaped to twist their respective torsion columns equally and oppositely during the movement of said first and second output parts relatively toward and away from each other, and wherein each of said number of torsion column units includes a pair of said cam couples diametrically opposite to each other, the cam tracks of said diametrically opposite cam couples being mutually complementary.

27. A spring mechanism as in claim 23, 24, 25 or 26, wherein the torsion column of each of said number of torsion column units comprises a cluster of duplicate resilient metal rods, including said one rod, said duplicate rods being of regular polygonal cross-section.

* * * * *